Patented Mar. 10, 1925.

1,528,908

UNITED STATES PATENT OFFICE.

ALBERT V. BLEININGER, OF NEWELL, WEST VIRGINIA, ASSIGNOR OF ONE-HALF TO FRANK H. RIDDLE, OF DETROIT, MICHIGAN.

PROCESS OF FORMING CERAMIC PRODUCTS.

No Drawing. Application filed March 19, 1923. Serial No. 626,168.

*To all whom it may concern:*

Be it known that I, ALBERT V. BLEININGER, a citizen of the United States of America, residing at Newell, in the county of Hancock and State of West Virginia, have invented certain new and useful Improvements in Processes of Forming Ceramic Products, of which the following is a specification.

This invention relates to the molding of a ceramic material and has for its purpose the production of an initial hardening brought about within the ceramic material after it has been molded, through the addition of certain constituents disseminated through the material previous to casting or pouring.

Another object of the invention is to accelerate the initial hardening of the poured or cast ceramic mass to a point at which the mold may be removed so that the required number of articles may be produced with the smallest number of molds, thus increasing the capacity of each mold.

A further object of the invention is to induce a sufficient degree of self-hardening of a ceramic mass to an extent which makes possible the removal of a mold after a reasonably short time independent of any evaporation of water or of absorptions of water by the mold whereby to permit the use of hard and durable molds in place of the soft, absorbent molds of plaster of Paris which have only a limited life and must constantly be replaced at great expense.

The principle involved in the process herein described may be summarized by stating that it consists essentially in the fixation, binding or absorption of a portion of the free water contained in a fluid ceramic suspension through reagents incorporated within the fluid mass. The absorption of some of the water may take place in various ways, both chemical and physical in all of which the free water disappears and is converted into a solid phase.

In the casting process and in washing clays the addition of alkaline reagents is effective in reducing the water content required to keep the mass in a fluid condition. The addition of alkali to a clay suspension brings about first a decided fluidity maximum followed by alternating minima and maxima phases until finally the phases merge in a definite direction. Coagulating reagents, acids, and salts, may be used to increase the plasticity and strength of certain clays and to thicken suspensions of glazes and enamels. The coagulating ions apparently increase in effectiveness proportionately with their valence. The presence of electrolytes affects not only the magnitude of the contraction in drying, but the capillary flow of the water through the clay as well.

Upon the addition of an alkali to clay, there is apparently an action very similar to that of a chemical reaction inasmuch as the alkali is fixed as if it were combined with part of the clay substance. At the same time, heat is absorbed. The physical effect of the action is that the clay particles become very much smaller by the breaking up of the larger aggregates into individuals particles. It also appears that the chemical action has resulted in liberating some water from the clay particles which now becomes free and thus increases the fluidity of the system. In other words, in deflocculation, some water seems to be squeezed out of the clay particles which now float in the fluid. In coagulation, the reverse effect takes place and energy is liberated as heat. The particles become larger and they absorb water.

It seems that we are here actually dealing with chemical reactions in the formation of complex compounds between the alkali and the acid clay colloid in defloculation and their breaking up in coagulation. That no more alkali is needed than the small amount actually used is due to the fact that in clays we are dealing with only very small amounts of colloid matter.

However, owing to the extreme fineness of the colloid portion of clay, it is of greater importance in clay working than all the rest of the clay constituents. Deflocculation thus appears as a chemical reaction between the clay colloid and the alkali which results in the formation of a sol which is of lower water content than the gel which exists in coagulation. Hence the sol leaves a greater amount of free water than the gel which is more saturated with water within its own structure.

The present process is analogous to the pouring of concrete into molds and its hardening therein, excepting that the compositions are of a ceramic nature and involve the use of mixtures containing larger or smaller quantities of clay. It is understood that articles so molded are to be dried and fired as is customary in the manufacture of ceramic products. It is common knowledge that ceramic compositions are already being molded by casting, that is, by being poured as more or less viscous, fluid suspensions into absorbent plaster of Paris molds which absorb part of the water and thus permit the removal of the article from the mold when the mass has hardened sufficiently by the removal of water. The amount of water absorbed exteriorly by the plaster of Paris mold is the chief factor in the casting process as used at the present time. Certain articles are being poured at the present time in non-absorbent metal molds and the liquid suspension is caused to harden by the evaporation of the water from the free surfaces.

The casting or pouring process of the present invention is identical up to a certain point with the processes already in use inasmuch as the ceramic material is made up with sufficient water and small amounts of deflocculating agents such as sodium carbonate, sodium silicate, ammonium hydroxide, caustic soda, sodium oxalate, tannic or gallotannic acid, to bring about the necessary fluid condition and deflocculation with the minimum water content but the maximum possible density.

The specific deflocculating agents used will be selected according to the nature of the ceramic materials. For instance, in the treatment of certain fire clays sodium oxalate may be used as the deflocculant.

But before casting or pouring the viscous suspension of ceramic material into the mold, additions of one or more of certain substances are made which are to be thoroughly and quickly incorporated by mixing. The casting or pouring must then be done as quickly as possible, since the changes brought about by the reacting substances may begin immediately upon the addition of the reagent. According to the character of all the materials involved, the kind of product to be formed, and the rapidity with which the initial hardening is to take place, the molds may be made of plaster of Paris, of metal, of wood, or of any other suitable material.

The essential process involved in the process of the initial hardening is the elimination of part of the free water which causes the suspension to be fluid. This may be accomplished by altering the colloidal state of the suspended ceramic material or that part of it which may be designated to be approximately colloidal from the deflocculated to the coagulated state. In the former condition, the viscosity is comparatively low so that fluidity is possible, while in the latter it is so high that the ceramic material has become plastic. The elimination of the free water may be also accomplished by its direct fixation in the form of chemical water of hydration, crystallization, combination or absorption. Both actions may be also caused to go on simultaneously. They are merely means of accomplishing one and the same thing, namely, the elimination of the free water which causes fluidity, by its chemical change into some fixed or solid form.

It is further understood that the elimination of the free water as described above may also be combined with the cementation of the particles of the ceramic mass, solidified to a plastic material, through the use of glue-like, adhesive substances or cements, both organic or inorganic. It is evident that the absorption of the free water may take place by a process which results at the same time in a cementing substance which imparts to the solidified mass additional hardness, strength or tenacity, or again the elimination of the free water may be caused by the action of one substance in the presence of another substance which in itself may not take up water but does exercise a cementing action, thus making it possible to subject the formed and partially hardened ceramic article to rougher handling.

These several actions may be illustrated as follows by typical examples:

If to a liquid, viscous suspension in water of ceramic material which has been deflocculated by means of alkaline carbonates, silicates, oxalates, or hydroxides, or organic deflocculants, there is added a sparingly soluble salt; such as a sulphate, phosphate or other compounds, the mass becomes coagulated after a given time, (which varies with the solubility of the compound) and stiffens, being converted from the liquid to the plastic state. This involves a change in the colloidal state, the rapidity of which may be controlled by the selection of a salt of suitable solubility, or by causing the salt to dissolve less rapidly through intimate chemical or physical combination with an inert substance. This might be done by producing an intimate mixture of the salt with clay, bentonite or other inert substances, drying and heating or calcining the mixture until there occurs a partial or complete chemical or physical combination. In place of the salt, we would add the prepared mixture or combination of the salt with the inert and insoluble substance. The change involved in this example would be equivalent to the absorption of a portion of the free water by the coagulated ceramic mass through a rearrangement of the fine particles or molecules from the previous state of deflocculation. It is analogous to the change of liquid fruit juice to a jelly.

If to a deflocculated fluid suspension of ceramic materials there is added just before pouring or casting, a finely powdered, anhydrous calcium-aluminum silicate or magnesium-aluminum silicate, such as a calcium zeolite, hydraulic cement, Portland cement or granulated furnace slag, there occurs both a fixation of part of the water and an interchange of bases. Both of the processes tend to change the viscous liquid to a plastic substance. If for the purpose of illustration we assume that sodium carbonate has been used as the deflocculating reagent the reaction with an anhydrous calcium zeolite would be approximately as follows:

$Na_2CO_3$ plus $CaO.Al_2O_3.2SiO_2$ plus $xH_2O$ (free water) equals $CaCO_3$ plus $Na_2O.Al_2O_3.2SiO_2.yH_2O$.

In this case a partial elimination of the deflocculating agent takes place thus causing partial coagulation to occur and in addition some of the free water is fixed as chemically combined water; materials like hydraulic lime and Portland cement would behave in a similar manner.

A simple absorption of water from the fluid, deflocculated suspension of ceramic material would be represented by the addition of ground substances like dried or calcined clay, bentonite, silicic acid, alumina, bauxite, etc., although it is apparent that some absorption of the deflocculating reagents may occur at the same time. It is essential that the rate of absorption of the water be determined by the regulation of the fineness of grain of the absorbing substances or by the degree of calcination, or by both expedients.

Self-hardening of the poured, viscous suspension of ceramic materials may be brought about also by various reactions involving the use of one or more of organic substances, such as glues, flour, gums, soaps, starches, dextrine, or casein, which may combine the fixation of part of the free water with a cementing action, imparting to the self-hardened mass additional strength and tenacity. It is understood that such organic substances may be combined with the use of the other dehydrating agencies referred to above. It is understood that after complete drying all organic matter is to be destroyed in the firing of the ceramic mass.

In certain cases, the dispersing medium of the ceramic materials will not be water but will be some liquid such as glycerine, acetone, alcohol, dissolved shellac, dissolved rosin compounds, dissolved casein, amyl acetate, linseed oil, etc. In these cases, the initial set or hardening is to be produced by the addition of such organic or inorganic substances as will bring about a partial or complete solidification of the mass.

For example using glycerine as the suspending medium, the addition of caustic lime and magnesia cause it to become saponified. This action induces setting of the mass.

When soluble pyroxylin is dissolved in acetone, wood alcohol, or amyl acetate, and used as the suspending medium, it will combine with camphor to form a plastic mass, thus changing the liquid suspension to a plastic one.

When an alkaline compound of casein, soluble in water is used as the suspending medium of the ceramic body, the mass can be made to harden to a stiff plastic consistency by the addition of lime, or calcium tannate.

In general any ceramic mass containing deflocculated or colloidal material may be made to acquire an initial set by a physical or chemical reaction which will result in coagulation of a portion of the material.

It will be understood that only such a degree of hardening is necessary as will make it possible to remove the mold from the formed article or the article from the mold and that by no means such a degree of mechanical strength will be acquired as it will attain ultimately upon complete drying and firing.

It will also be understood that the ceramic material may be either raw or calcined or may be a mixture of the two, and that they may be either coarse or fine, or a mixture of coarse and fine according to the results to be produced in the final body, and it will be further understood that any or all of the processes which cause an intial set or hardening of the ceramic mass may be used according to the results desired.

From the foregoing description it will be apparent that a ceramic composition in the form of a more or less fluid suspension in water or other liquids may rapidly be formed into a large variety of useful shapes by pouring it into molds which are either absorbent or non-absorbent within which it will quickly undergo an initial hardening or set, which will permit the removal of the mold and its further use within a reasonably short time, and while the removal of the water is not primarily due to absorption into a porous mold or to the evaporation of water from exposed surfaces, these may be supplementary processes. Durable non-absorbent molds may thus replace the relatively fragile absorbent plaster of Paris molds now commonly used, and because of the greater rapidity of initial hardening it will be evident that a smaller number of molds be required than is possible with the ordinary methods,

I claim:—

1. In the process of forming ceramic products from a fluid suspension containing colloidal clay material, the step which consists in adding a coagulating reagent to increase the viscosity of the mass and effect fixation of a portion of the liquid content.

2. In the process of forming ceramic colloidal clay products, the step which consists in adding to a suspension of ceramic material in a liquid, a reagent having the chemical property of causing conversion of part of the liquid into a solid phase, whereby the initial hardening occurs within the formed material by the fixation of part of the free liquid.

3. The process of forming ceramic products which consists in preparing a ceramic mass containing deflocculated clay material, adding thereto a coagulating reagent to effect delayed chemical reaction, and placing the mixture in a mold.

4. The process of forming ceramic products which comprises providing a plastic ceramic mass, adding thereto a deflocculating reagent to produce a fluid suspension, adding a substance capable of combining with the deflocculating reagent to neutralize its deflocculating action and to effect fixation of a portion of the fluid content of the mass, and placing the mixture within a mold.

5. The process of forming ceramic products which consists in causing deflocculation of a portion of a ceramic clay mixture in a fluid suspension having a colloidal content, adding thereto a coagulating reagent to effect a delayed change in the colloidal content, and before the action of the reagent is completed, placing the mixture in a mold.

6. The process of forming ceramic products, which process consists in preparing a suspension of ceramic material of clay content in a liquid, preparing a composition consisting of a reagent adapted to cause fixation of part of the free liquid and a substance capable of retarding the reaction, mixing the composition with the fluid suspension, and placing the mixture in a mold before the fixation of the liquid is completed.

7. In the process of forming ceramic products capable of acquiring an initial hardening within a mold, the steps which consist in preparing a suspension of ceramic material of colloidal clay content in a liquid, and adding thereto one or more reagents having the property of causing a chemical change in the colloidal content and the fixation of part of the free liquid and also having the property of increasing the adhesion of particles of the material between each other when some of the liquid has become fixed to change the mass from a fluid to a plastic state without removal of the liquid entirely by absorption or evaporation.

8. The raw batch of a cast ceramic body in which the initial hardening has been effected by a chemical change of part of the free water content from a liquid to a solid phase.

In testimony whereof I affix my signature in presence of two witnesses.

ALBERT V. BLEININGER.

Witnesses:
FRANK H. RIDDLE,
ARTHUR MINNICK.